United States Patent [19]

Yeates et al.

[11] Patent Number: 5,010,121
[45] Date of Patent: Apr. 23, 1991

[54] PRODUCTION OF AQUEOUS-BASED FLUOROPOLYMER COMPOSITIONS

[75] Inventors: Steven G. Yeates, Macclesfield; John C. Padget, Frodsham, both of England

[73] Assignee: Imperial Chemical Industries PLC, London, England

[21] Appl. No.: 280,879

[22] Filed: Dec. 7, 1988

[30] Foreign Application Priority Data

Dec. 10, 1987 [GB] United Kingdom ................ 8728884

[51] Int. Cl.$^5$ ................................................ C08J 3/00
[52] U.S. Cl. ...................... 523/336; 524/458; 524/544; 525/276; 525/326.2; 525/386
[58] Field of Search ............................. 524/458, 544; 525/326.2, 386, 276; 523/336

[56] References Cited

U.S. PATENT DOCUMENTS 4,036,802  7/1977  Poirier ................................. 524/458
4,487,893 12/1984  Yamake et al. .................. 525/326.2
4,647,612  3/1987  Rands et al. ........................ 524/458

Primary Examiner—Joseph L. Schofer
Assistant Examiner—Mark Sweet
Attorney, Agent, or Firm—Cushman, Darby & Cushman

[57] ABSTRACT

Production of an aqueous-based composition comprising a fluoropolymer and a vinyl copolymer by (1) preparing a non-aqueous solution of a fluoropolymer comprising repeat units derived from at least one fluorolefine and repeat units bearing chain-pendant disperser groups imparting water-emulsifiability or water-solubility to the fluoropolymer; (2) converting the non-aqueous solution formed in step (1) into an aqueous-based emulsion or solution of said fluoropolymer; and (3) polymerising at least one vinyl monomer to form a vinyl polymer in the presence of said aqueous-based emulsion or solution from step (2).

19 Claims, No Drawings

PRODUCTION OF AQUEOUS-BASED FLUOROPOLYMER COMPOSITIONS

The present invention relates to a process for the preparation of certain aqueous based compositions containing certain fluoropolymers and vinyl polymers, and to the compositions so produced.

It is known to employ aqueous-based dispersions of various fluoropolymers (by which we mean fluorine-containing homo- and copolymers e.g. homo- and copolymers of fluoroolefines such as tetrafluoroethylene, trichlorofluoroethylene and vinylidene fluoride) as the basis for the provision of coatings of exceptionally high quality in terms of durability, weatherability, chemical, ultraviolet and thermal stability, stain resistance, and appearance. Such desirable properties stem from the well-known chemical, solvent and thermal resistance, weatherability, low friction characteristics, good mechanical properties and water repellancy of the fluoropolymers themselves. However, coatings derived from such dispersions mostly require baking at elevated temperatures when being prepared in order that they should be coherent (because of the inherent crystallinity of most types of commonly employed fluoropolymers), so that their use is restricted to locations where heating equipment is available or its use practicable. Moreover, fluoropolymers tend to be expensive materials.

It has been proposed to employ aqueous-based dispersions of certain of these fluoropolymers in combination with acrylic polymers in order to achieve coherent film-formability at ambient temperatures; this also has the attraction of providing a cheaper coating material (most acrylic polymers being much less expensive than fluoropolymers). For example, U.S. Pat. No. 4141873 discloses aqueous-based dispersions comprising a mixture of a vinylidene fluoride polymer and an acrylic polymer said to be film-formable at ambient temperatures. Nevertheless, it is stated therein that coherent films cannot be prepared from such compositions at ambient temperatures unless they contain at least 25% by weight (of the total polymer weight) of acrylic polymer. Moreover, most other fluoropolymers are poorly thermodynamically compatible with acrylic polymers so that coherent films cannot generally be formed from aqueous dispersions containing the two types of polymer unless elevated taking temperatures are employed (good thermodynamic compatibility in this context is taken to mean the situation where there is intimate mixing of the fluoropolymer and acrylic polymer at the molecular level). This has the added disadvantage that transparent films cannot readily be obtained on ambient or low-temperature application should these be desired.

We have now discovered how to prepare aqueous-based compositions of fluoropolymers and vinyl polymers in general (i.e. not merely acrylic polymers, although these are preferred) in which the fluoropolymers and vinyl polymers are in extremely intimate admixture in the composition (in comparison to admixture achieved by simple latex blending) irrespective of whether the two types of polymer are thermodynamically compatible (they may or may not be compatible) and irrespective of the level of vinyl polymer. Thus the fluoropolymer types employed can vary over a wide range of basic composition (and in particular are not limited to vinylidene fluoride homo-and copolymers). Many of these compositions yield coherent film coatings under ambient or low temperature (e.g. up to 60° C.) application conditions which possess advantageous attributes derived from the fluoropolymer component (as discussed above) at lower cost; such films may be transparent if desired (by (by employing appropriate formulations, i.e. not including opacifying materials). Moreover, the new process allows a very precise control over the polymer microstructure.

According to the present invention there is provided a process for preparing an aqueous-based composition comprising a fluoropolymer and a vinyl polymer which process comprises:

(1) preparing a non-aqueous solution of a fluoropolymer comprising repeat units A derived from at least one fluoroolefine and repeat units B bearing chain-pendant disperser groups imparting water-emulsifiability or water-solubility to the fluoropolymer;

(2) converting the non-aqueous solution of said fluoropolymer formed in step (1) into an aqueous-based emulsion or solution of said fluoropolymer; and (3) polymerising at least one vinyl monomer to form a vinyl polymer in the presence of said aqueous-based emulsion or solution from step (2).

In the composition produced by the process of the invention (effectively an aqueous polymer latex composition although non-aqueous solvent material employed during its preparation may still be present if not subsequently removed) it is believed that the fluoropolymer and vinyl polymer are intimately admixed in the aqueous-based composition either (in the case of a fluoropolymer emulsion being formed in step (2)) by virtue of at least some (and perhaps substantially all) of the vinyl monomer(s) employed for the vinyl polymerisation in step (3) becoming absorbed within and/or on the fluoropolymer particles during polymerisation or (in the case of a fluoropolymer solution being formed in step (2)) by virtue of the solubilized fluoropolymer molecules acting as an emulsifying agent in the polymerising vinyl monomer/polymer mixture; it is also possible (we believe) that both mechanisms could operate at the same time (depending on the degree of water solubility of the fluoropolymer, in turn dependent on the concentration of disperser groups present in the fluoropolymer). In this way at least some (and perhaps substantially all) of the polymerisation of the vinyl monomer(s) to the vinyl polymer takes place in extremely close proximity to the fluoropolymer molecules irrespective of the inherent thermodynamic compatibility of the fluoropolymer and vinyl polymer. In a sense, therefore, intimate admixture is forced on the fluoropolymer and vinyl polymer. It can also be appreciated that the process of the invention allows very good control of the locus of polymerisation, and hence close control of the type of polymer microstructure, to be achieved. For example, polymerisation of the vinyl monomer soley in the aqueous phase, or within the fluoropolymer particles themselves, or in intermediate polymerisation loci, can be achieved.

The fluoropolymer comprising repeat units A derived from at least one fluoroolefine and repeat units B bearing chain-pendant disperser groups is, for example, prepared as follows. A free-radical addition copolymerisation of at least one fluoroolefine and at least one olefinically unsaturated comonomer (which is copolymerisable with the fluoroolefine(s)) having at least one functional group is carried out (optionally with other comonomer(s)) to yield a precursor copolymer having units of the fluoroolefine(s) and also units having the functional group(s). (By a functional group in this context is meant a pendant reactive group which can be subsequently converted by one or more reactions to a disperser group). Suitable precursor fluoropolymers of this type may be available commercially so that it may not be necessary to perform this polymerisation oneself. At least some of the chain-pendant functional groups of the precursor copolymer are then converted by one or more reactions (as necessary) to disperser groups which as defined above can impart water-emulsifiability or water-solubility to the fluoropolymer (repeat units having such chain-pendant disperser groups are herein termed units B), this usually being done with the copolymer in non-aqueous solution. Suitable functional groups for incorporation into the precursor copolymer are e.g. hydroxyl, amino, and epoxy groups; however hydroxyl groups are particularly preferred.

It is also possible to directly form a fluoropolymer comprising repeat units derived from at least one fluoroolefine (units A) and repeat units B bearing chain-pendant disperser groups without the need to first form a precursor copolymer. This can be achieved by the copolymerisation of at least one olefinically unsaturated comonomer which already bears a disperser group(s) or a group that can then be converted to a disperser group(s) merely by neutralization (e.g. with base or acid). An example of such a fluoropolymer would be one comprising repeat units derived from at least one fluoroolefine and at least one olefinically unsaturated comonomer bearing a carboxylic acid group(s) whereby the pendant carboxyl groups in the resulting fluoropolymer could be converted to carboxylate anion disperser groups merely by neutralization with a base.

It is to be understood that the fluoropolymer may also (optionally) contain repeat units C derived from one or more ethylenically unsaturated monomers which units are neither derived from a fluoroolefine nor derived from a monomer which is functionalized to provide (ab initio or via further reaction) chain-pendant disperser groups. These units C e.g. may be incorporated by inclusion of such monomer(s) in the polymerisation to form the presursor copolymer.

Typically the fluoropolymer of the composition made by the claimed process comprises 30–80 weight % of units A derived from said at least one fluorolefine, 1–20 weight % of units B bearing chain-pendant disperser groups, and 0–69 weight % of other units C (i.e. neither derived from a fluoroolefine nor having pendant disperser groups).

The at least one fluorolefine providing repeat units A is broadly defined as an olefine having at least one fluorine atom substituent; preferably the fluoroolefine is a perhaloolefine in which all the hydrogen atoms of the olefine are substituted with fluorine atoms and optionally other halogen atoms.

From the point of view of polymerisability and resulting polymer properties fluoroolefines having 2 or 3 carbon atoms are preferable.

Examples of such fluoroolefines include fluoroethylenes such as $CF_2=CF_2$, $CHF=CF_2$, $CH_2=CF_2$, $CH_2=CHF$, $CClF=CF_2$, $CCl_2=CF_2$, $CClF=CClF$, $CHF=CCl_2$, $CH_2=CClF$, and $CCl_2=CClF$; and fluoropropylenes such as $CF_3CF=CF_2$, $CF_3CF=CHF$, $CF_3CH=CF_2$, $CF_3CH=CH_2$, $CF_3CF=CHF$, $CHF_2CH=CHF$, and $CF_3CH=CH_2$.

Of the fluoroethylenes and fluoropropylenes listed above tetrafluoroethylene ($CF_2=CF_2$), chlorotrifluoroethylene ($CClF=CF_2$), vinylidene fluoride ($CH_2=CF_2$), and hexafluoropropylene ($CF_2=CFCF_3$) are particularly preferred.

The use of the above exemplified fluoroolefines either singly or in admixture is of course included within the scope of the present invention.

Examples of suitable olefinically unsaturated comonomers bearing at least one functional group (for use in the preparation of a precursor copolymer) which are copolymerisable with fluoroolefines are hydroxy or amino vinyl ethers of formula:

$$CR^1R^2=CR^3O(CR^4R^5)_nQ$$

where $R^1$, $R^2$, $R^3$, $R^4$, $R^5$ may be independently H, alkyl (preferably of 1 to 5 carbon atoms), or halogen (preferably F, Cl), n is 2 to 8 and Q is OH or $NH_2$. Usually $R^1=R^2=R^3=R^4=R^5=H$, Q is OH and n is 2 to 6. Examples of such vinyl ethers are 2-hydroxyethyl vinyl ether, 3-hydroxy(n)butyl vinyl ether, 4-hydroxy(n)butyl vinyl ether, 3-hydroxy(n)propyl vinyl ether, 5-hydroxy(n)pentyl vinyl ether, and 6-hydroxy(n)hexyl vinyl ether. Other possible functional vinyl ethers include:

2,3-dihydroxypropyl vinyl ether;
3-hydroxy-2,2-dimethylpropyl vinyl ether;
2-methyl-2-hydroxymethyl-3-hydroxypropyl vinyl ether;
2-ethyl-2-hydroxymethyl-3-hydroxypropyl vinyl ether;
3-(hydroxymethyl)-5-hydroxypentyl vinyl ether;
2,2-bis(hydroxymethyl)-3-hydroxypropyl vinyl ether;
1-hydroxymethyl-4-vinyloxymethylcyclohexane;and
2-[2-hydroxyethoxy]ethyl vinyl ether.

Examples of monomers for providing optional units C include: alkyl, aryl, or cycloalkyl vinyl ethers (or fluoro-substituted derivatives thereof) such as cyclohexyl vinyl ether, ethyl vinyl ether, n-propyl vinyl ether, n-butyl vinyl ether, cyclopentyl vinyl ether, and phenyl vinyl ether; and vinyl esters (or the fluorinated derivatives thereof) such as $CH_2=CHOCOCH_3$ (vinyl acetate), $CH_2=CHOCOC(CH_3)(C_2H_5)([CH_2]_4CH_3)$, $CH_2=CHOCOC(CH_3)_2([CH_2]_5CH_3)$, and $CH_2=CHOCOPh$ (Ph is phenyl); and allyl or fluoroallyl ethers of formula $CH_2=CHCH_2OR^6$ where $R^6$ is an allyl or a fluoroallyl group of 2 to 10 carbon atoms, such as tetrafluoroallylether. Other possible monomers include alpha-olefines such as ethylene, propylene, isobutylene, and butene-1. Such additional units may usefully be used to control the glass transition temperature of the fluoropolymer.

By a vinyl polymer in this specification is generally meant any addition polymer of one or more olefinically unsaturated monomers other than a fluoropolymer as defined above. The vinyl polymer component of the aqueous dispersion may be formed by the homo- or copolymerisation of any suitable radically polymerisable olefinically unaturated compound (or mixture thereof). Thus, there may be mentioned hydrocarbon monomers e.g. butadiene, isoprene, styrene, and divinyl benzene; acrylic and substituted acrylic monomers, e.g. alkyl acrylates, alkyl methacrylates, acrylamide, methacrylamide, and acrylonitrile; vinyl halides, e.g. vinyl chloride; vinylidene halides, e.g. vinylidene chloride; vinyl esters; vinyl ethers; vinyl ketones; and heterocylic vinyl compounds. Multifunctional monomers such as diallyl phthalate and allyl methacrylate may also be included as comonomers. The vinyl polymer is particularly an acrylic polymer and especially a homo-or copolymeric acrylic polymer derived from at least one acrylic monomer having the formula $CH_2=CR^7COOR^8$ where $R^7$ is H or methyl and $R^8$ is alkyl or cycloalkyl of 1 to 20 carbon atoms (more preferably 1 to 6 carbon atoms). Examples of these are, for instance, methyl acrylate, methyl methacrylate, ethyl acrylate, ethyl methacrylate, and n-butyl acrylate; where the acrylic polymer is a copolymer, the comonomer(s) may be another acrylic monomer (e.g. as exemplified above) and/or a non-acrylic monomer such as styrene. The vinyl polymer is optionally cross-linkable. Such cross-linkability in the vinyl polymer may be achieved, for example, by including polymerised units of at least one functional monomer in the polymer, such as for instance hydroxyethyl methacrylate, glycidyl methacrylate, acrylamide, and methacrylamide. If such a functional monomer is vinylic in nature, it may constitute the sole monomer of the vinylic polymer; more usually however it is a comonomer employed with a nonfunctional vinylic monomer(s) (particularly one or more of those described above).

The chain-pendant disperser groups of the fluoropolymer may be ionic (usually anionic) and/or non-ionic in nature and may be introduced by any suitable technique.

Preferably the disperser groups comprise anionic groups and typically acid salt groups such as carboxylate. By disperser groups we mean groups that will cause the fluoropolymer to become well dispersed in an aqueous medium when incorporated into such a medium. By dispersed we mean that the fluoropolymer is in an emulsified state or is in aqueous solution. When emulsified, the fluoropolymer particles can range from quite large in size (say average particle size of > 1 to 10 microns) to colloidal size (say average particle size of 0.01 to 1 microns). Whether or not a fluoropolymer is likely to become emulsified or solubilized in the aqueous medium will depend on the level and type of disperser groups in the fluoropolymer.

One preferred method for introducing anionic carboxylate salt disperser groups is that based on a process described in U.S. Pat. No. 4487893 for producing carboxyl group-containing fluoropolymers. Using such a method, a non-aqueous solution of a precursor copolymer comprising units of at least one fluorolefine and units of a hydroxyl-functional comonomer providing chain-pendant hydroxyl groups is reacted with a dibasic acid anhydride of formula

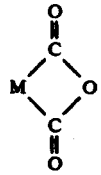

where M is a divalent organic group whereby at least part of the chain-pendant hydroxyl groups are converted to chain-pendant carboxylic acid-containing groups of formula

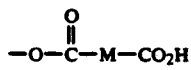

where M is as defined above. The solvent (or solvent mixture) at this stage should be selected taking into account the solubilities of the fluoropolymer and dibasic anhydride used (this of course applies generally when undertaking any conversion of a functional group in a precursor polymer to a disperser group; i.e. the solubilities of the fluoropolymer and the converting reagent should be taken in account when selecting the solvent). Suitable solvents include aromatic liquids with boiling point above 100° C. such as xylene and toluene. Water-miscible (lower boiling) solvents such as acetone may, however, be used in some circumstances. As the dibasic anhydride there may be mentioned succinic anhydride, glutaric anhydride, itaconic anhydride, adipic anhydride, 1,2-cyclohexanoic dicarboxylic acid anhydride, cis-4-cyclohexane-1,2-dicarboxylic acid anhydride, phthalic anhydride, 1,8-naphthalic anhydride and maleic anhydride. In view of their reactivity, non-aromatic carboxylic anhydrides are preferred. Particularly preferred are those in which M is an alkylene group having from 2 to 8 carbon atoms, such as $-CH_2CH_2-$.

The degree of conversion of the hydroxyl groups to

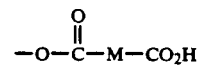

groups may deliberately be made partial or complete depending on the degree of colloidal dispersability required in the final fluoropolymer (by employing sufficient of the anhydride to react with some or with all of the hydroxyl groups; all the anhydride used will be consumed provided an excess is not present). Generally speaking the $CO_2H$ equivalent weight in the fluoropolymer should be in the range 500 to 2500 $gmole^{-1}$.

The solvent medium of the solution of fluoropolymer (containing pendant carboxyl groups) may at this point be replaced by a water-miscible solvent medium of appropriate hydrophilicity for the subsequent water-dispersion stage (step (2) of the process of the invention), if it is not already a solvent medium of appropriate hydrophilicty. Thus e.g. a xylene solvent medium may be replaced with a water-miscible solvent such as acetone.

The next stage is the neutralization (in the non-aqueous solution) of the acidic carboxyl groups to form corresponding carboxylate salt groups—these being the anionic disperser groups in the fluoropolymer. Suitable neutralising agents include ammonia, tertiary amines such as triethylamine, and heterocyclic compounds such as pyrrole, pyridine or pyridazine. Preferably complete neutralization of the acid groups is effected, although less than complete neutralization can be employed provided the stability of the subsequently—formed aqueous dispersion of the fluoropolymer is not adversely affected.

The non-aqueous solution of the fluoropolymer bearing chain-pendant disperser groups (which can be ionic or non-ionic as discussed above) from step (1) of the process of the invention is converted in step (2) into an aqueous-based emulsion or solution of said polymer. This may usually be accomplished by simply admixing (usually with agitation) a non-aqueous solution of the fluoropolymer with water. The solvent medium for this step (which may be a mixture of two or more organic liquids—although a single organic liquid can be used) provides appropriate solvent and diluent characteristics and is not necessarily the same as any solvent medium which might initially have been employed in step (1) (as e.g. when converting functional groups in a precursor polymer to disperser groups). In particular it must possess sufficient hydrophilicity for the transition to an aqueous emulsion or solution (on the admixture with water) to be effected in a facile manner and with the provision of a final aqueous-based dispersion (i.e. after vinyl polymerisation in step (3)) of adequate long-term stability. Therefore, before the admixture with water, any solvent medium which may have been used (e.g. at an initial stage) in step (1) (as e.g. when converting functional groups to disperser groups) and if inappropriate for the transition to an aqueous-based emulsion or solution in step (2), should be replaced by such a hydrophilic solvent medium for use in step (2), e.g. by adding the new solvent medium and removing the initially employed solvent medium by evaporation (preferably under mild conditions as found e.g. in a rotary evaporator). This solvent replacement stage may be effected before or after the formation of the chain-pendant disperser groups on the fluoropolymer (if not already on the fluoropolymer ab initio) but is normally effected beforehand (and particularly before neutralization in the case of forming pendant anionic emulsifier groups) in which case it forms part of step (1).

Of course, it may not be necessary to go through any solvent interchange at all in step (1). Thus one could use in stage (1) a fluoropolymer in a dried state (e.g. as a fine powder) irrespective of any solvent used in its preparation; one could then dissolve this up in a suitable hydrophilic solvent and then (if necessary) form any pendant disperser groups (e.g. by neutralization of carboxyl groups to carboxylate anion groups with a base).

Typical hydrophilic solvent materials for use in the non-aqueous solvent medium employed in the dispersion step of step (2), which, as explained supra, may be incorporated as part of step (1), include water-miscible organic compounds such as ketones such as acetone, methyl ethyl ketone, or cyclohexanone; alcohols such as methanol, ethanol, isopropanol, n-propanol, t-butanol, or n-butanol; ethers such as dimethylcarbinol or tetrahydrofuran, amides such dimethyl formamide or dimethylacetamide; and heterocyclics such as N-methyl pyrollidone. Further, one or more of the monomers to be employed in the subsequent vinyl polymerisation of step (3) may be used as, or as part of, the solvent medium used for the dispersion in step (2) provided it (or they) has suitable solvent/diluent characteristics (as discussed above). Examples of such monomers include n-butyl acrylate and acrylonitrile.

At the end of stage (2) there exists an aqueous-based emulsion or solution of the fluoropolymer. Effectively this is an aqueous latex or aqueous solution of the fluoropolymer, although organic solvent is still present in the aqueous medium. This may optionally be removed (before or after the subsequent vinyl polymerisation) although it is often allowed to remain. The average particle size of emulsified fluoropolymer particles which may be present at the end of stage (2) is usually below 10 microns, and usually within the range 0.01 to 5 microns, and preferably within the range 0.01 to 0.5 microns.

In stage (3) of the process of the invention, the vinyl monomer (or monomers) required for the vinyl polymerisation is (are) admixed with the fluoropolymer emulsion or solution from stage (2), unless of course it has itself been employed as, or as part of, the non-aqueous solvent medium of stages (1) or (2) and is therefore already present.

The vinyl polymerisation of step (3) of the process of the invention may be carried out by any suitable free-radical initiated polymerisation technique appropriate to the vinyl monomer(s) that is being polymerised, a free-radical initiator and (usually) appropriate heating being employed. For example, the initiator system may be added to a mixture of the fluoropolymer dispersion and all the vinyl monomer(s) to be polymerised, or all or some of the vinyl monomer(s) to be polymerised may be added (e.g. gradually or in stages) to the fluoropolymer dispersion (optionally containing at least one vinyl monomer for polymerisation) containing initiator (or a part of the initiator system), with appropriate heating being applied. Suitable free radical initiators include mixtures partitioning between the aqueous and organic phases, e.g. combinations of t-butylhydroperoxide, isoascorbic acid and Fe. EDTA.

The average particle size of the dispersed multi polymer particles at the end of stage (3) (i.e. of the aqueous-based composition made according to the process of the invention) is usually below 10 micron, and preferably within the range 0.01 to 5 microns, particularly 0.01 to 0.5 microns.

An advantageous feature of the present invention is that the vinyl polymerisation may be performed without any external surfactant being present (as is normal during conventional vinyl aqueous emulsion polymerisation). Consequently, the aqueous-based dispersion of the invention can be surfactant-free (with attendant advantages flowing therefrom). Naturally, however, where the disperser groups of the fluoropolymer are anionic in nature (e.g. carboxylate salt-type) the presence of free acid(s) in the aqueous- based dispersion of the fluoropolymer before or after vinyl polymerisation should normally be avoided as it may destabilise the dispersion. (Thus, e.g., a free acid monomer, such as acrylic acid, should not normally be employed in the vinyl polymerisation when the fluoropolymer contains anionic chain-pendant emulsifier groups). However, the presence of small levels of acid (such as acrylic acid) can sometimes be present if the system is appropriately bufferred. This restriction does not of course apply when the fluoropolymer has only non-ionic chain-pendant emulsifier groups. Thus, aqueous-based polymer compositions produced by the process of the invention (bearing in mind the above- mentioned proviso) are stable for long periods of time despite the absence of external surfactants (acting as emulsifiying agents). If desired, however, minor amounts of external surfactants may be included in the dispersions (being incorporated e.g. in the vinyl polymerisation step or subsequent thereto).

The fluoropolymer and/or the vinyl polymer may optionally possess the facility (by the inclusion of appropriate functionalities therein, and ensuring an appropriate locus for the vinyl polymerisation as explained supra) for enabling a certain proportion of graft polymerisation to occur between the polymers during the vinyl polymerisation. In the case of the fluoropolymer this may e.g. be realized by employing appropriate functionalised monomer(s) which provide part of the other units C in the fluoropolymer. Similarly, one or more of the vinyl monomers may be appropriately funtionalised to provide this facility.

The fluoropolymer and/or the vinyl polymer may also optionally posses the facility (by the inclusion of appropriate functionalities therein) for imparting cross-linkability to the resulting polymer dispersion according to the invention.

It is believed that, in effect, the fluoropolymer in the aqueous-based dispersion from step (2) of the process of the invention acts as surfactant-free seed particles for the subsequent vinyl polymerisation and/or as water-soluble emulsifying molecules acting at the surface of the vinyl monomer/vinyl polymer system undergoing polymerisation. In either case an extremely intimate mixture of the two polymers results. Such an aqueous composition has significantly improved properties, particularly in comparison to aqueous dispersion blends of fluoropolymers and vinyl polymers in which the polymers are inherently thermodynamically incompatible (as is usually the case). Thus unlike simple blends which may separate and form hazy films when used as coating compositions, the compositions of the present invention are highly resistant to separation and, as a result, many of them are able to form very clear films even at ambient or low temperatures (provided of course no opacifying additives are present).

The weight ratio of fluoropolymer to vinyl polymer in the dispersion is suitably in the range from 99/1 to 5/95, preferably 95/5 to 10/90, and particularly 90/10 to 15/85.

The minimum film-forming temperature of the aqueous-based compositions of the invention may vary over a wide range, e.g. within the range $-10°$ to $120°$ C. (more usually 0 to $80°$ C.).

As mentioned above, precursor fluoropolymers having functional groups which are suitable for conversion into disperser groups (to provide fluoropolymers as used in the present invention) may be available commercially, in which case they may be purchased rather than prepared. However, they can be prepared if necessary by appropriate copolymerisation of at least one fluoroolefine with at least one copolymerisable comomoner bearing an appropriate functional group (or groups). Such precursor fluoropolymers may be prepared by conventional polymerisation in aqueous emulsion, in aqueous suspension, in solution or in bulk. Polymerisation is usually carried out in the temperature range $-20°$ to $180°$ C., more usually $80°$ to $150°$ C., under a pressure usually in the range 1 to 50 $Kg/Cm^2$. A free-radical yielding initiator is normally employed, for example an organic peroxide, azo compound, or a redox initiator system comprising persulphate (as appropriate to the polymerisation medium). Optionally a chain transfer agent, for example methyl cyclohexane, may be used to control the molecular weight. The polymerisation medium may, for example, be water or an aqueous medium (in the case of emulsion or suspension polymerisation) or an appropriate organic solvent (in the case of solution polymerisation). Emulsion polymerisation is normally performed in the presence of a surfactant(s) as emulsifier.

For the conversion of the precusor fluoropolymer to a fluoropolymer bearing chain-pendant disperser groups, the precursor polymer should be dissolved in a non-aqueous solvent medium. Consequently, the precursor fluoropolymer must be an organo-soluble material; some fluoropolymers will accordingly be unsuitable for this purpose and the selection of the comonomer(s) may be crucial to achieve solvent solubility. If the precursor polymer is prepared using an aqueous medium it should of course first be separated from the aqueous phase used in its preparation (in fact it is normally, before dissolution, a dry product separate from any medium used in its preparation—even if this is a non-aqueous solvent). This solvent medium initially employed (typically e.g. xylene or toluene) is often replaced by a more hydrophilic solvent medium prior to dispersion of the fluoroolefine (bearing disperser groups) in water as described above.

The fluoropolymer used in the composition invention usually has a number average molecular weight Mn within the range 500 to 300,000 (more usually 1000 to 150,000). The vinyl polymer usually has Mn within the range 1000 to 500,000.

The aqueous-based composition produced by the process of the invention may also include, or be subsequently formulated with, various other ingredients. For example, it may if desired include, or subsequently be formulated with, ingredients commonly employed in film-forming coating formulations, such as defoamers, rheology control agents, thickeners, dispersing and stabilizing agents (usually surfactants), wetting agents, fillers, extenders, fungicides, coalescing solvents, plasticisers, anti-freeze agents, and pigments. The composition of the invention may also if desired contain, or be subsequently formulated with, one or more other type of polymer (i.e. polymer other than that used in stages (1), (2) and (3) as defined above). Such an other type of polymer could e.g. be a condensation polymer such as a polyurethane, an epoxy polymer or a polyester. For some applications, it is envisaged that the composition will be in the form of, or will subsequently be used in a formulation to provide, a paint, and will therefore include materials commonly employed in paint formulations, such as pigments and other ingredients where appropriate (extenders, stabilisers, thickeners, coalescing solvents, defoamers, surfactants, and so on).

The fluoropolymer compositions of the present invention may be used for coating substrates and can be applied in the same manner as any ordinary liquid coating materials to the surface of a substrate such as metal, wood, plastics, ceramic, paper or glass. Any suitable coating method may be used, e.g. brush, spray, roller or dipping. Coherent film formation may often be achievable by employing ambient temperature application conditions although sometimes low temperature heating (e.g. up to $60°$ C.) may be required. The film coatings from the fluoropolymer compositions of the invention are of high quality, having the excellent properties imparted by the fluoropolymer component as well as good gloss and (if appropriately formulated) transparency.

The present invention is now illustrated by the following examples. Unless otherwise specified all parts and percentages are on a weight basis.

EXAMPLE 1

A commercially available functionalised fluoropolymer, 'Lumiflon' LF916 (Asahi Glass), having hydroxyl and carboxyl functionalities was employed as a precursor polymer. This polymer is considered to comprise units of chlorotrifluoroethylene and certain other vinyl ether compounds. The exact composition of this copolymer was not indicated although the respective functionality contributions were as follows:

OH=58 mg KOH:OH eq.wt=967.2

$CO_2H$=7 mg KOH:$CO_2H$ eq.wt=8014

Approximately 50% of hydroxyl groups in the precursor polymer were converted to anionic chain-pendant disperser groups as follows. The precursor polymer was provided as a 65% w/w solution in xylene and 100 g of this solution, together with further xylene (50 g), was charged to a stirred vessel under nitrogen. The contents of the vessel were heated (with agitation) to 110° C. and succinic anhydride (3.36 g) added along with triethylbenzoyl ammonium bromide (0.168 g; 5% on succinic anhydride). After 25 minutes at this temperature the reaction was complete (as noted by infra-red spectroscopy applied to small samples taken periodically). Half of the pendant hydroxyl groups were therefore converted to chain-pendant groups of formula

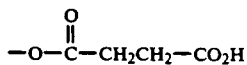

The xylene was removed by rotary evaporation (50° C., 6.5 m Bar).

70.22 g of the resulting resin were dissolved in 1/1 acetone /n-butyl acrylate solvent medium to give a resin/solvent weight ratio of 60/40 (0.03 g of 'Topanol' O, a hindered phenol antioxidant, being included to stabilise the n-butyl acrylate). All the acid groups in the resin were then neutralized to carboxylate salt groups by the addition of triethylamine (4.552 g) to provide the anionic chain- pendant disperser groups.

An aqueous-based dispersion of this fluoropolymer was prepared by adding 65.37 g of the fluoropolymer solution to water (91.52 g) with stirring over 30 minutes; this resulted in a blue-tinged dispersion with the following properties:

| average particle size | 0.091 micron |
|---|---|
| pH | 8.67 |
| solids content (excluding butyl acrylate) | 22.97% w/w |
| Brookfield Viscosity (Spindle 3 Setting 12) | 150 centipoise |
| Minimum Film Forming Temperature | <5° C. |

A 50/50 w/w fluoropolymer/acrylic polymer aqueous-based dispersion according to the invention (the acrylic polymer being a methyl methacrylate/n-butyl acrylate copolymer; 66/34 weight-ratio) was prepared as follows. 120 g of the above aqueous-based dispersion of fluoropolymer (containing 27.57 g fluoropolymer and 9.19 g n-butyl acrylate) were charged to a stirred vessel and heated to 75° C. To the vessel was added t-butylhydroperoxide (0.14 g; 0.5% on monomer). A mixture of isoascorbic acid (8.27 g; 0.3% on monomer; 1% aqueous solution) and water (31.73 g), and methyl methacrylate (18.38 g; plus a drop of triethylamine) were then added dropwise over 30 minutes. The polymerisation was continued for about 30 minutes and the system was sparged to removed acetone and any residual vinyl monomer. An extremely stable aqueous-based latex of the fluoropolymer and acrylic polymer resulted, with <1% coagulum being observed. The properties of the composition were:

| average particle size | 0.049 micron |
|---|---|
| pH | 8.04 |
| solids content | 31.2% w/w |
| % monomer conversion | 100% |
| Brookfield Viscosity (Spindle 3 Setting 12) | <100 cps |
| Minimum Film Forming Temperature | 21.4° C. |

Clear films were cast from this emulsion of small particle size.

EXAMPLE 2

To a reaction vessel was charged 1421 g of 'Lumiflon' LF916 (stripped of xylene) and 948 g of acetone. Dissolution of the precursor polymer in the acetone to give a 60% w/w solution was carried out by heating to 50° C. under mild agitation. The vessel contents were then heated to 60° C. under nitrogen, and succinic anhydride (75.53 g) and triethylbenzoyl ammonium bromide (3.68 g) added. After 3 hours at this temperature the reaction was complete (as noted by infra-red spectroscopy applied to periodically taken samples), whereby half the pendant hydroxyl groups were converted to chain-pendent groups of formula

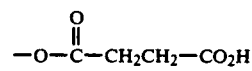

Triethylamine (74.35 g) was added to the acetone solution to neutralize the available carboxyl groups to carboxylate salt disperser groups. After 30 minutes, the neutralized polymer solution was added to water (4000 g) over a 1 hour period with stirring. The acetone was then removed to yield a translucent dispersion of the polymer in water having the following properties:

| average particle size | 0.025 micron |
|---|---|
| pH | 8.0 |
| Solids content | 26.82% w/w |
| Minimum Film Forming Temperature | 16° C. |

A 50/50 w/w fluoropolymer/acrylic polymer aqueous dispersion according to the invention (the acrylic polymer being a methyl methacrylate/n-butyl acrylate copolymer; 80/20 weight-ratio) was prepared as follows. 150 g of the above aqueous-based dispersion of fluoropolymer were charged to a stirred vessel and heated to 76° C. To the vessel was added t-butylhydroperoxide (0.20 g; 0.5% on monomer). A mixture of isoascorbic acid (4.02 g; 0.3% on monomer; 1% aqueous solution) and water (95 g), and methyl methacrylate (32.18 g) and n-butyl acrylate (8.05 g) (plus a drop of triethylamine) were separately added dropwise over 30 minutes. The polymerisation was continued for about 30 minutes after which the vessel was cooled to room temperature. A stable fluoropolymer/acrylic polymer dispersion resulted having <1% coagulum. The properties of the composition were:

| average particle size | 0.040 micron |
|---|---|
| pH | 8.6 |
| Solids content | 27.5% w/w |
| % monomer conversion | 98% |
| Minimum Film Forming Temperature | 35° C. |

Films were cast from this composition (drying 100° C./3 minutes) and had the following properties shown below. The properties of films cast from (a) a blend of the precursor fluoropolymer xylene solution and a solution of the separately-prepared acrylic polymer (Mn 50000) in xylene (50/50 w/w) (Example C3) and (b) a solution of the separately-prepared acrylic polymer only in xylene (Example C4) are given for comparison purposes.

| Composition of Example No. | Film Clarity | 60° Gloss Retention (1000 hours QUV accelerated weathering tester*) |
| --- | --- | --- |
| 2 | Clear | 90% |
| C3 | Opaque | 65% |
| C4 | Clear | 30% |

*12 hour cycle (8 hours UV at 50° C. plus 4 hours condensation at 40° C.)

We claim:

1. Process for the preparation of an aqueous-based composition comprising a fluoropolymer and a vinyl polymer which process comprises:
   (1) preparing a non-aqueous solution of a fluoropolymer comprising repeat units A derived from at least one fluorolefine and repeat units B bearing chain-pendant ionic and/or non-ionic disperser groups where such groups impart water-emulsifiability or water-solubility to the fluoropolymer;
   (2) converting, by virtue of the effect of said emulsifying or solubilizing disperser groups, the non-aqueous solution of said fluoropolymer formed in step (1) into an aqueous-based emulsion or solution of said fluoropolymer, and
   (3) polymerising at least one species of vinyl monomer to form a vinyl polymer in the presence of said aqueous-based emulsion of solution from step (2).

2. Process according to claim 1 wherein said fluoropolymer used in step (1) has been derived from a precursor polymer, which precursor polymer comprises repeat units A derived from said at least one fluorolefine and repeat units derived from at least one olefinically-unsaturated monomer having at least one functional group which becomes chain-pendant in the precursor polymer, by means of converting at least a proportion of said chain-pendant functional groups in the precursor polymer to chain-pendant disperser groups thereby forming repeat units B.

3. Process according to claim 2 wherein said chain-pendant functional groups of the precursor polymer are selected from hydroxyl, amino, and epoxy groups.

4. Process according to claim 1 wherein said disperser groups comprise groups which are anionic in nature.

5. Process according to claim 4 wherein said anionic groups are carboxylate salt groups.

6. Process according to claim 5 wherein said carboxylate salt disperser groups are provided in step (1) by:
   (a) reacting a non-aqueous solution of a precursor polymer, comprising repeat units A derived from at least one fluorolefine and repeat units of a hydroxyl-functional olefinically-unsaturated comonomer providing chain-pendant hydroxyl groups in the precursor polymer, with a dibasic anhydride of formula:

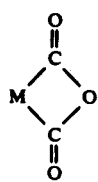

where M is a divalent organic group, whereby at least a proportion of the chain-pendant hydroxyl groups are converted to chain-pendant carboxylic acid-containing groups of formula:

$$-O-\overset{O}{\underset{\|}{C}}-M-CO_2H$$

where M is a defined supra;
   (b) replacing the solvent employed in step (a), if necessary, with a water-miscible non-aqueous solvent-medium; and
   (c) neutralising at least a proportion of the carboxyl groups to form corresponding carboxylate salt groups.

7. Process according to claim 6, wherein the non-aqueous solvent medium used in step (a) is itself water-miscible and the replacement step (b) is not employed.

8. Process according to claim 1 wherein said disperser groups comprise groups which are non-ionic in nature.

9. Process according to claim 1 wherein the conversion in step (2) is effected by admixing a non-aqueous solution of said fluoropolymer with water.

10. Process according to claim 9 wherein the non-aqueous solvent medium employed for said admixture is the non-aqueous solvent medium resulting, from step (1).

11. Process according to claim 1 wherein a non-aqueous solvent medium is employed for the formation of an aqueous-based emulsion or solution in step (2) which comprises at least one water-miscible solvent selected from acetone, methyl ethyl ketone, cyclohexanone, methanol, ethanol, isopropanol, n-propanol, t-butanol, n-butanol, dimethylcarbinol, tetrahydrofuran, dimethyl formamide, dimethylacetamide, and N-methyl pyrollidone.

12. Process according to claim 1 wherein a non-aqueous solvent medium is employed for the formation of an aqueous-based emulsion or solution in step (2) which comprises at least one vinyl monomer to be polymerised in step (3).

13. Process according to claim 1 wherein said fluoropolymer comprises repeat units C derived from at least one olefinically unsaturated monomer which units are neither derived from a fluorolefine nor derived from a monomer which is functionalised to provide (ab initio as via further reaction) chain-pendant disperser groups.

14. Process according to claim 1 wherein said at least one fluorolefine providing repeat units A is selected from at least one of tetrafluoroethylene, chlorotrifluorethylene, vinylidene fluoride and hexafluoropropylene.

15. Process according to claim 1 wherein said vinyl polymer formed in step (3) is an acrylic polymer.

16. Process according to claim 15 wherein said acrylic polymer is a homo- or copolymeric acrylic polymer derived from at least one acrylic monomer of formula $CH_2=CR^7COOR^8$ where $R^7$ is H or methyl, and $R^8$ is alkyl or cycloalkyl of 1 to 20 carbon atoms.

17. Process according to claim 1 wherein the average particle size of the polymer particles formed in step (3) is within the range 0.01 to 5 microns.

18. Process according to claim 1 wherein the weight ratio of fluoropolymer to vinyl polymer in said composition is within the range of from 99/1 to 5/95.

19. An aqueous-based composition produced by a process according to claim 1.

* * * * *